United States Patent [19]
Muller

[11] 3,721,012
[45] March 20, 1973

[54] INTERNAL MICROMETER
[75] Inventor: Albert Muller, Crissier, Switzerland
[73] Assignee: Tesa S.A., Renes, Switzerland
[22] Filed: May 14, 1970
[21] Appl. No.: 37,193

[30] Foreign Application Priority Data
May 16, 1969 Switzerland..........................7461/69

[52] U.S. Cl. ..............................................33/178 R
[51] Int. Cl. ..........................G01b 3/46, G01b 5/08
[58] Field of Search ..33/178 R, 164 C, 143 G, 147 K

[56] References Cited
UNITED STATES PATENTS
2,604,703   7/1952   Meyer...............................33/178 R
2,047,607   7/1936   Zimmerman......................33/178 R Primary Examiner—Leonard Forman
Assistant Examiner—A. J. Mirabito
Attorney—James M. Heilman and Heilman & Heilman

[57] ABSTRACT

The present invention has for its object, an internal micrometer comprising a cylindrical body, a control shaft which is movable in a rotational and longitudinal manner within the body and two conical coaxial members connected to one another by a rod, driven by said shaft and controlling the movements of at least one measuring key movable perpendicularly to the shaft of said conical members.

4 Claims, 3 Drawing Figures

PATENTED MAR 20 1973

3,721,012

INVENTOR.
ALBERT MULLER
BY James M. Heilman
ATTORNEY.

INTERNAL MICROMETER

Internal micrometers comprising a micrometer reading drum rigidly connected to a shaft carrying a micrometer screw which engages in a mounting and a coaxial member in the form of a cone or a conical helicoidal ramp on which are supported movable, radial cylindrical feelers, are known. In these instruments, the rotation of the reading drum causes the shaft to rotate and therefore also the micrometer screw which in turn ensures the longitudinal displacement of the shaft and drum. When the shaft is displaced longitudinally the conical member also moves and the feelers move radially closer to or further away from one another, these movements being proportional to the travel of the shaft.

These instruments give excellent results but have the disadvantage that they cannot be used for the measurement of small diameter bores, such as bores of less than 6 mm. because the measuring head, i.e. the feelers, the conical member controlling them, the return means which maintain the feelers against the conical member and the fitting which supports and guides said members, takes up too much space and its dimensions cannot be reduced beyond certain limits.

With the aim of remedying these disadvantages and in order to permit the measurement of small internal dimensions, the present invention has for its object, an internal micrometer comprising a body, a control shaft which is movable in a rotational and longitudinal manner within the body and two conical coaxial members connected to one another by a rod, driven by said shaft and controlling the movements of at least one measuring key movable perpendicularly to the shaft of said conical members, characterized in that an arm is coupled to the body, that the measuring key comprises an elongated core extending along the arm and guided by the latter over at least part of its length, carrying at one of its ends a feeler for making contact with the inside surface of a bore to be measured and at its other end a support member sliding in slots made respectively in the arm and the body, and that one of the conical members is located in the body and controls the movements of the support member carried by the core of the key, while the other conical member contacts the movements of another part of the key.

The attached drawing shows by way of example one embodiment of a device according to the invention.

Figure 1:
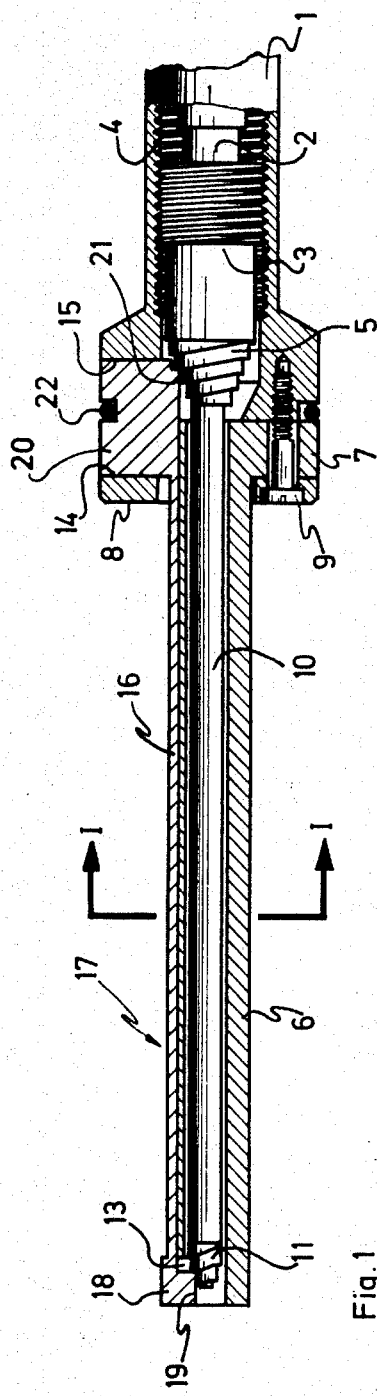
FIG. 1 is a part sectional elevation.
Figure 3:
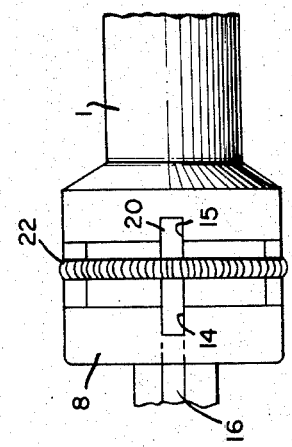
FIG. 3 is a side view of the body.

The internal micrometer shown comprises a body 1 in which is located a shaft 2 of which one end is rigidly connected to a graduated reading drum (not shown) rotatably associated with the body 1. The shaft 2 has a coaxial micrometer screw 3 engaging a thread 4 cut in the body 1. The other end of the shaft 2 is designed so as to form a coaxial, conical, helicoidal ramp 5 having the same pitch as the screw 3.

The body 1 is connected to a tubular arm 6 of which one end is free while the other end has a support 7 coupled to the body 1 against which it is held by a retaining disk 8 fixed to the body 1 by screws 9.

In the tubular arm 6 is placed a rotatable rod 10 coaxial to the shaft 2 and of which one end is connected to the small end of the conical helicoidal ramp 5. The other end of the rod 10 is located inside the tubular arm 6 and carries a conical and coaxial helicoidal ramp 11. The ramp 11 is arranged in the same direction as the ramp 5 and the axial pitch and radial pitch of the two ramps are respectively identical.

Figure 2:
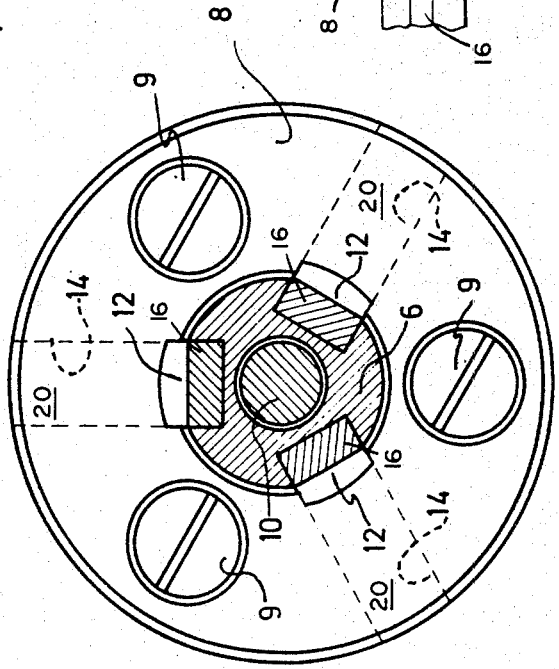
FIG. 2 is an enlarged section on the line I—I of FIG. 1.

The outer wall of the arm 6 is cut by three longitudinal grooves 12 (FIG. 2) arranged at 120° to one another on the periphery of the arm 6, each of said grooves terminating at one of its ends in a radial slot 13 made at the free end of the tubular arm 6 and at its other end in a radial slot 14 made in the support 7 and arranged so as to face a radial slot 15 made in the body 1.

In each of the grooves 12 there is disposed the elongated longitudinal core 16 of a movable key 17. One of the ends of the core 16 has a radial feeler 18 which is parallel to the axis of the rod 10 extending along the slot 13 of arm 6. The feeler includes a slider 19 supported on the ramp 11. The other end of the core 16 has a radial support member 20 located in the recess formed by the slots 14 and 15 of the support 7 and the body 1. The support member 20 is held in its recess by the retaining disk 8 and has a slider 21 supported on the ramp 5. Each of the support members 20 is traversed by a transverse groove and a circular return spring 22 placed in said grooves and consequently, surrounding the micrometer, ensures the radial return of the keys 17.

The micrometer described functions as follows:
when the reading drum is turned the latter drives the shaft 2 and micrometer screw 3 which is longitudinally displaced in the instrument. The rotation and displacement of the shaft 2 causes the simultaneous rotation and displacement of the ramp 5, the rod 10 and the ramp 11. The sliders 19 and 21 of the keys 17 are supported on the ramps 5 and 11 and the rotation and displacement of the latter will thus cause radial displacement of the keys 17. Given that ramps 5 and 11 have identical axial pitch and radial pitch, the keys 17 will move parallel to the axis of the rod 10 and therefore parallel to the axis of the instrument. As the ramps 5 and 11 have the same pitch as the micrometer screw 3, the radial displacement of the keys 17 and therefore, their feelers 18 will be proportional to the displacement of the reading drum, the graduation of which will permit the direct reading of the measurement made by the feelers 18.

The micrometer described offers the advantage of permitting the measurement of very small internal dimensions because the use of two conical members of different dimensions to control the displacement of the contacts, the simplification of the guiding of the feelers due to the overall guiding of the keys and the fact that the return of the keys is remote from the feelers permit a very considerable reduction in the dimensions of the different members forming the measuring head.

As the feelers are located at the end of the arm, internal dimension measurements can be made to a certain depth, the latter being naturally a function of the length of the arm 6. As the spring 22 is placed between the conical members 5 and 11, its action extends to the whole length of the keys 17 of which the sliders 19 and 21 are constantly in contact with the ramps 11 and 5. There is therefore no irregularity in the displacement of the keys and as they perform a translational movement perpendicular to the instrument axis, the mounting of the feelers 18 remains constant and is not disturbed by the return spring.

Due to the space saving obtained it is possible to use three keys to obtain a greater measuring accuracy. This number is not, however, limitative and can be reduced or even increased.

The conical helicoidal ramps described can be replaced by smooth cones, the angles of which are selected so as to ensure a movement of the contacts which is proportional to the graduated drum movement.

The micrometer described can be manufactured without difficulty in dimensions permitting the measurement of internal dimensions well below 6 mm. and its use permits real measurements to be made without any necessity of using an auxiliary comparator.

It is possible to place the conical member 11 so that it extends beyond the end of the arm 6, the feelers 18 also being placed beyond the end of the arm and supported on the conical member, guiding then being assured solely by the core 16 and the contact support member 20.

According to another variation the conical member 11 can be placed in the arm 6 at a certain distance from the free end thereof, the feelers 18 being arranged at the end of said arm. In this case, the conical member 11 cannot act directly on the feelers 18 and instead acts on the core 16 of contact 17.

Finally, it is possible to place the conical member 11 in the arm 6, while the feelers 18 are placed in front of and outside thereof. In this case, once again the conical member 11 cannot act directly on the feelers and its action is on the core of the key, the guiding of the feelers being assured by the core and the support member of the keys.

I claim:

1. An internal micrometer comprising:
   a. an elongated tubular arm for insertion into a hole to be measured, said arm formed with a plurality of longitudinal grooves, each of said grooves extending the length of said arm and terminating in a slot at one end, of each arm said arm terminating in a cylindrical body at the end, said body having radial slots
   b. a plurality of longitudinal elongated movable measuring keys, one positioned in each of the grooves in said arm, each key having a radially extending feeler positioned in the slot adjacent to the end of the arm which is to be inserted into the hole, the other ends of the keys terminated by radial support members positioned in the slot in the cylindrical body;
   c. a return spring surrounding the support members for moving the support members, the measuring keys, and the radial feelers toward a central axial position in the tubular arm;
   d. an axial rotatable rod positioned in the center of the tubular arm, terminated at one end by a helicoidal ramp in contact with the radial feelers, and terminated at the other end by a similar helicoidal ramp in contact with the radial support members; and
   e. a shaft secured to the rotatable rod coupling the rod to a micrometer screw and to a manual means for turning the rod.

2. A micrometer according to claim 1 wherein the return spring is positioned on the measuring keys between the points of contact of the support member and radial feelers with the two ramps for providing for the return of the keys towards the axis of the tubular arm.

3. A micrometer according to claim 1 wherein said return spring is formed in a helix and is positioned in a circumferential slot in said support members.

4. A micrometer according to claim 1 wherein said micrometer screw is secured to a reading drum which includes graduations thereon for indicating the diameter of the measured hole.

* * * * *